(No Model.)
J. W. STREET.
PREPARING MEATS FOR TRANSPORTATION.
No. 396,344. Patented Jan. 15, 1889.
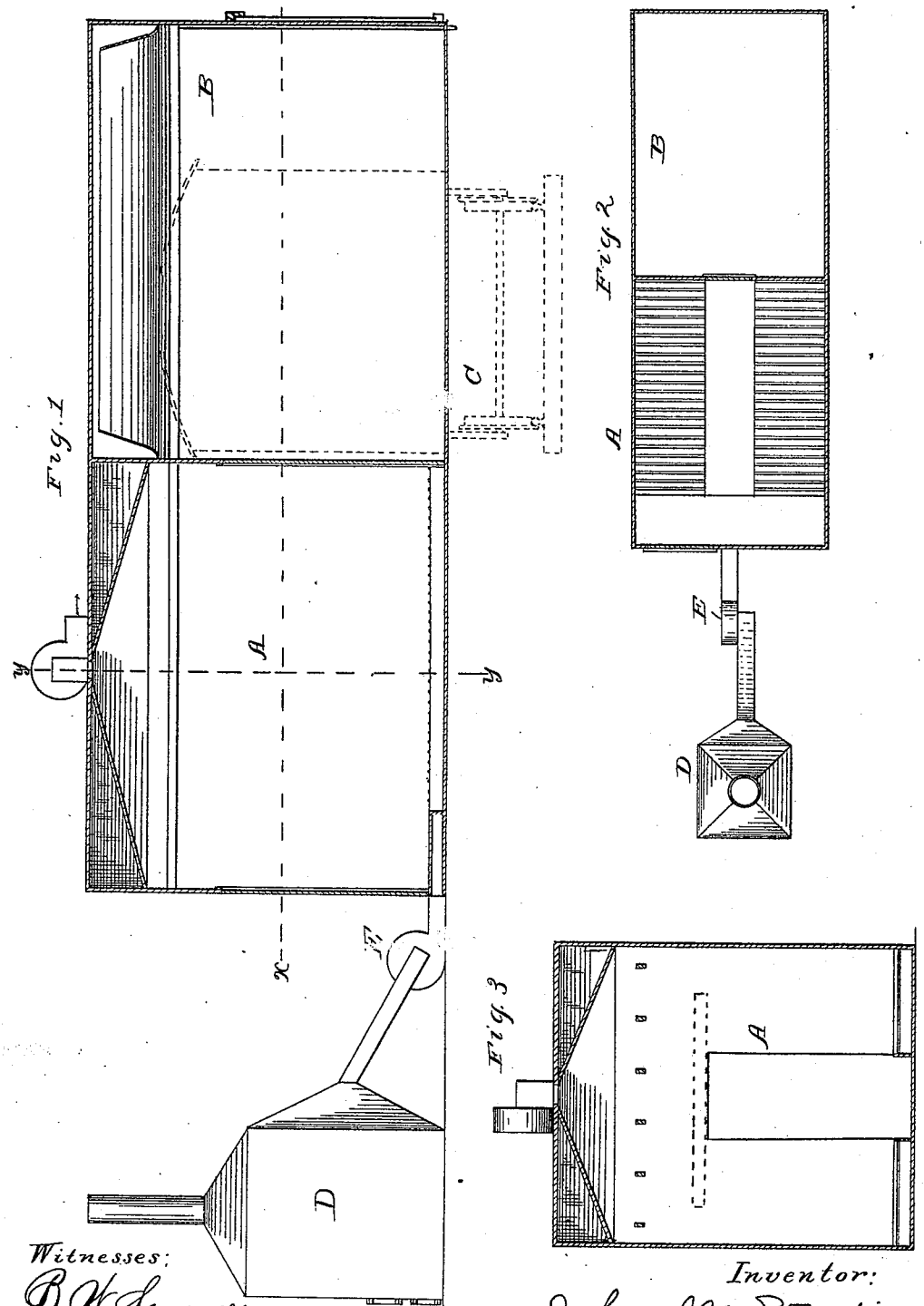

UNITED STATES PATENT OFFICE.

JOHN W. STREET, OF CHICAGO, ILLINOIS.

PREPARING MEATS FOR TRANSPORTATION.

SPECIFICATION forming part of Letters Patent No. 396,344, dated January 15, 1889.

Application filed March 29, 1886. Serial No. 197,001. (No specimens.)

*To all whom it may concern:*

Be it known that I, JOHN W. STREET, a citizen of the United States, residing at Chicago, in the county of Cook and State of Illinois, have invented certain new and useful Improvements in the Process of Treating Meat for Preservation, of which the following is a specification, reference being had therein to the accompanying drawings.

This invention relates to a novel process or method of treating beef or other meat, whereby it can be put into such condition that it can be transported for long distances and preserved for considerable time, and whereby it shall be so prepared as to have a better flavor and superior quality generally in comparison with that which is now provided by slaughtering in one section of the country and then transporting to another.

My improved process is based upon the following facts: If beef after slaughtering is exposed for a considerable time to air which is pure and relatively dry, (I preferably using a volume of air put into rapid and forcible circulation,) and which is also at a comparatively high degree of temperature—that is, in contradistinction to a refrigerating temperature of from 30° to 40° Fahrenheit—an action more or less similar to that which would have taken place had life continued develops into gaseous or vaporous forms the waste material left in the meat after the cessation of vitality, and these will escape from the tissue and are carried off by the air. After such an exposure for a period of time of suitable length the temperature can be safely lowered sufficiently to arrest the action last referred to and prevent the further escape of such materials. The products of normal waste can be withdrawn to such an extent that they cease to develop noxious gases or vapors while subjected to any of the ordinary degrees of temperature, and meats so treated can be preserved at a reduced temperature for a long time without impairing either flavor or quality.

My present process comprises the following matters: After slaughtering, the meat is exposed in an inclosed chamber to the action of currents of air, which, if the normal conditions of the atmosphere require it, I heat for the purpose of raising the temperature. In doing this the air is passed through or over hot surfaces, whereby the temperature can be raised, and whereby the relative humidity can be lowered. The absolute humidity, also, may be lowered to advantage, either by employing heat sufficiently high to dehydrate it or by means of any of the hygroscopic materials.

By employing air at a relatively high temperature I attain one of the ends above set forth—that is, I further the action by which the products of normal waste are withdrawn in a gaseous or vaporous form—and can also attain more or less of the other objects at which I aim—that is, cause the moisture or products so developed to be rapidly carried away from proximity to the meat.

Of course it will be understood that if the air has been primarily heated to a very high degree for any purpose it can be tempered by cooling agents to lower it to a point suitable for application to the meat. This can be done by any of the well-known devices now used for such purposes.

The temperature to which I subject the meat while treating it is at a point between 60° and 70° Fahrenheit on the one hand, and that at which cooking or destruction of tissue occurs on the other. There can be variations in this respect within these limits, as the requisite is that the air should be heated to such an extent as to make it efficient in facilitating the development and escape of the waste products, and also that it must not approach that point where the tissue is broken down or destroyed.

In regard to the length of time during which the meat is to be subjected to the steps above mentioned it must be noted that an absolutely invariable rule cannot be laid down. In this respect there must necessarily be some variation required by the sizes and the consistency of the articles or pieces which are being treated. Under most circumstances I find that I can attain the end aimed at in a period of from two to forty-eight hours. When small articles or pieces are being treated, the time is considerably less than it is when a larger portion or the whole of an animal is being subjected to the process.

I have shown in the drawings an apparatus which can be used in carrying out the process.

Figure 1 shows, partly in side view, partly in vertical section, said apparatus. Fig. 2 is a horizontal section on the line x x, Fig. 1. Fig. 3 is a cross-section on the line y y, Fig. 1.

A represents a compartment adapted to hold the meat while being subjected to the first steps. It may be provided with non-conducting walls to prevent the escape of heat and to insure uniformity of temperature, and it can be provided with tracks or guides for cars, trucks, or racks whereon the meat is supported. The air which is delivered to the interior of this compartment is represented as being forced into it by means of a fan, E, which takes the air from a furnace or heating apparatus at D. Air circulating or distributing fans may be arranged in any suitable way in the compartment A, for insuring that all of the air shall be effective both in the matter of giving the proper temperature to the meat and in the matter of withdrawing therefrom the gases and the vapors which are evolved. It is in this compartment or its equivalent that the meat is exposed, under the conditions described, for a period of time sufficient to insure that all the products of normal waste shall have escaped. After the treatment has been effected here the meat can be either taken directly to the transporting-vehicles, (a refrigerator-car being indicated in the drawings at C,) or it can be stored temporarily in a cooling-room, such as shown at B. This may be immediately contiguous to the compartment A—that is to say, they may be separated by a single wall, (preferably non-conducting,) or they can be situated in any preferred way with respect to each other. The refrigerating of the compartment B can be effected by any of the well-known devices.

I believe myself to have been the first to have subjected meat to a series of steps such as those herein described at the times and under the conditions set forth. Of course I am aware of the fact that meats of various kinds and fish and other food substances have been dried for the purpose of preserving them to greater advantage; but, so far as my knowledge goes, the desiccating action has been accomplished at a time considerably after the cessation of life and after the products of normal waste have become fixed in the mass of the material—that is to say, the process heretofore followed has been one merely of desiccation, properly speaking; but I believe myself to be the first to subject newly-slaughtered beef (before the products of normal waste have become fastened in the mass of the meat and before the escape thereof, carried on during vitality, had wholly ceased) to the action of rarefied air, in the presence of which the mass is induced to continue the action of throwing off these products, and subsequently, after said escape has been completed, refrigerating or cooling the meat to such a degree that the generation of such waste products as are produced by decay will be arrested.

What I claim is—

1. The herein-described process of preparing meat, it consisting in subjecting it immediately after slaughtering and while inclosed in an apartment to the action of currents of air forced through the said apartment and heated to a temperature between 70° Fahrenheit and the degree at which cooking occurs, and maintaining said treatment until the products of normal waste have been eliminated, and subsequently cooling it to arrest the further elimination and escape of materials therefrom, substantially as set forth.

2. The herein-described process for preparing slaughtered beef for transportation, it consisting in first subjecting the said beef immediately after slaughtering and while inclosed in an apartment to the action of currents of air heated to a temperature between 70° Fahrenheit and that at which cooking occurs, said air having its humidity reduced before bringing it in contact with the meat, and maintaining such treatment until the products of normal waste have been eliminated, then inclosing said meat in a transporting-vehicle containing refrigerating or cooling apparatus, and therewith arresting further elimination and escape of materials from the meat, substantially as set forth.

In testimony whereof I affix my signature in presence of two witnesses.

JOHN W. STREET.

Witnesses:
W. W. DOUGHERTY,
D. BERGIN.